(12) United States Patent
Salter et al.

(10) Patent No.: US 10,160,405 B1
(45) Date of Patent: Dec. 25, 2018

(54) VEHICLE DECAL ASSEMBLY

(71) Applicant: Ford Global Technologies, LLC, Dearborn, MI (US)

(72) Inventors: Stuart C. Salter, White Lake, MI (US); Paul Kenneth Dellock, Northville, MI (US); Jeffrey Singer, Plymouth, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/683,268

(22) Filed: Aug. 22, 2017

(51) Int. Cl.
| B60R 13/04 | (2006.01) |
| G02B 27/42 | (2006.01) |
| G02B 5/18  | (2006.01) |
| F21V 9/30  | (2018.01) |

(52) U.S. Cl.
CPC ............. B60R 13/04 (2013.01); F21V 9/30 (2018.02); G02B 5/1866 (2013.01); G02B 27/4205 (2013.01)

(58) Field of Classification Search
CPC ..... B44C 1/17–1/1708; B44C 1/1733–1/1745; B60R 13/04; F21V 9/30; G02B 5/1866; G02B 27/4205
USPC .............................................. 428/195.1, 914
See application file for complete search history.

(56) References Cited

U.S. PATENT DOCUMENTS

| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,724,161 A * | 3/1998 | Smith et al. ............. G03H 1/00 359/13 |
| 5,839,718 A | 11/1998 | Hase et al. |
| 6,031,511 A | 2/2000 | DeLuca et al. |
| 6,117,362 A | 9/2000 | Yen et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |

(Continued)

FOREIGN PATENT DOCUMENTS

| CN | 1125172 A | 6/1996 |
| CN | 101337492 A | 1/2009 |

(Continued)

*Primary Examiner* — Bruce H Hess (74) *Attorney, Agent, or Firm* — Jason Rogers; Price Heneveld LLP (57) ABSTRACT

A vehicle decal assembly is provided herein. The decal assembly includes a substrate having a diffraction grating along a surface thereof. A luminescent structure is disposed along a surface of the substrate. A reflective layer is disposed on an opposing side of the luminescent structure from the substrate. An adhesive layer is configured to maintain the substrate on a vehicle panel.

19 Claims, 5 Drawing Sheets

(56) References Cited

U.S. PATENT DOCUMENTS

| | | |
|---|---|---|
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0035331 A1 | 2/2005 | Sun |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2012/0301657 A1* | 11/2012 | Dietrichsson ............ B32B 3/02 428/80 |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Owenthal et al. |
| 2014/0266666 A1 | 9/2014 | Habibi |
| 2014/0373898 A1 | 12/2014 | Ogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201169230 Y | 2/2009 |
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1035160 A1 | 9/2000 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006029100 A1 | 3/2006 |
| WO | 2006047306 A1 | 5/2006 |
| WO | 2014068440 A1 | 5/2014 |
| WO | 2014161927 A1 | 10/2014 |

* cited by examiner

VEHICLE DECAL ASSEMBLY

FIELD OF THE INVENTION

The present disclosure generally relates to vehicle decals, and more particularly, to reflective vehicle decals.

BACKGROUND OF THE INVENTION

Decal assemblies are commonly employed on vehicles to display a vehicle manufacturer's logo, a company's logo, or other graphic display. For some vehicles, it may be desirable to have a more prominent decal assembly.

SUMMARY OF THE INVENTION

According to one aspect of the present disclosure, a vehicle decal assembly is disclosed. The vehicle decal assembly includes a substrate having a diffraction grating along a surface thereof. A luminescent structure is disposed along a surface of the substrate. A reflective layer is disposed on an opposing side of the luminescent structure from the substrate. An adhesive layer is configured to maintain the substrate on a vehicle panel.

According to another aspect of the present disclosure, a decal assembly for a vehicle is disclosed. The decal assembly includes a substrate having a diffraction grating along a surface thereof. The diffraction grating has a thickness of between about 250 nm to about 1000 nm. A reflective layer is disposed rearwardly of the substrate. An adhesive layer is configured to maintain the substrate on a vehicle panel.

According to yet another aspect of the present disclosure, a vehicle decal assembly is disclosed. The vehicle decal assembly includes a substrate having a diffraction grating along a surface thereof. A luminescent structure is disposed along a surface of the substrate. A reflective layer is disposed on an opposing side of the luminescent structure from the substrate. An adhesive layer is configured to maintain the substrate on a vehicle panel.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 2:
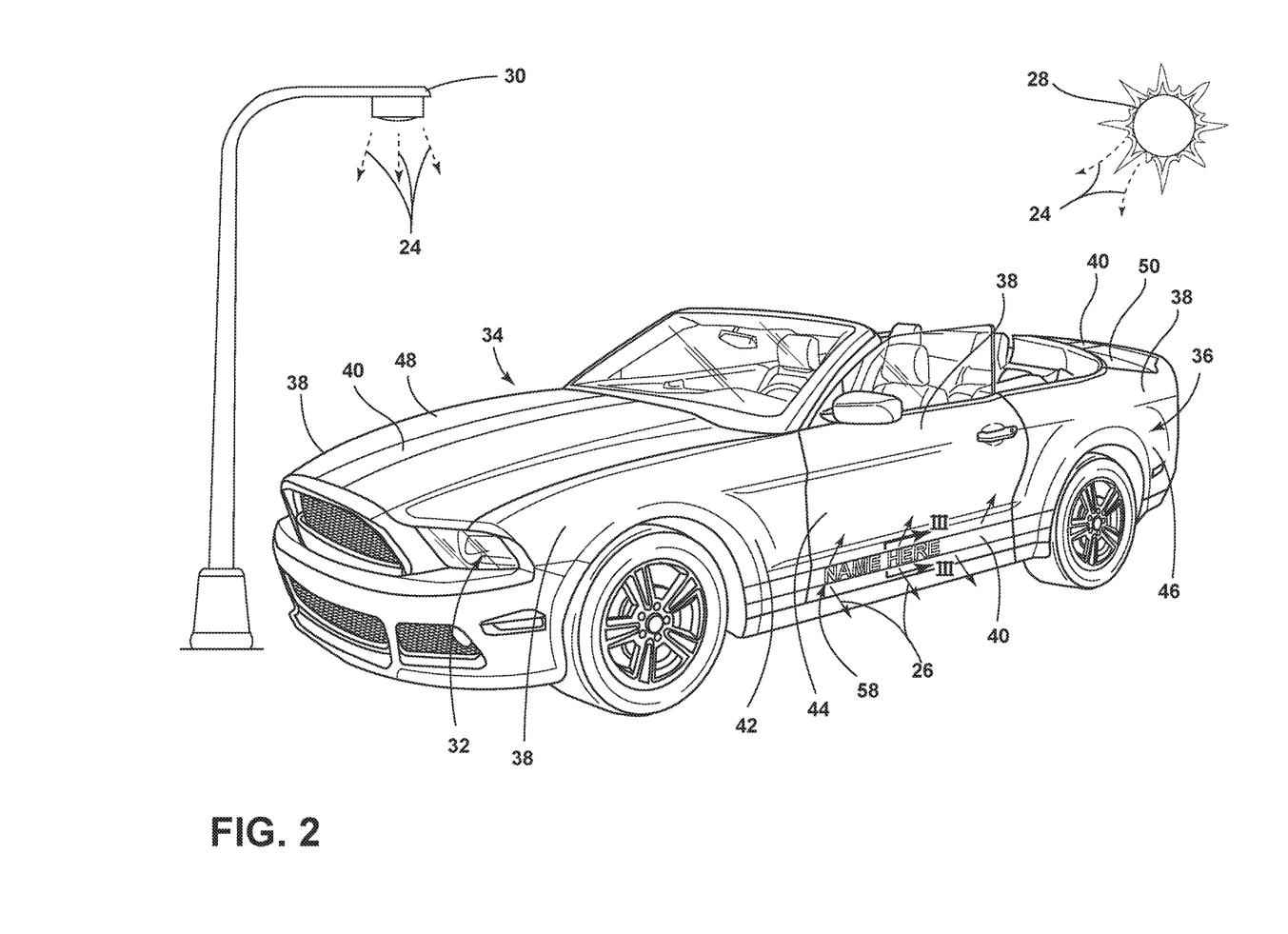
FIG. 2 is a side perspective view of a decal assembly disposed on a vehicle, according to various examples.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a decal assembly for a vehicle. The decal assembly may employ one or more phosphorescent and/or luminescent structures to luminesce in response to predefined events. The one or more luminescent structures may be configured to convert incident light received from an associated light source and re-emit the light at a different wavelength generally found in the visible spectrum. The decal assembly may further employ a diffraction grating pattern thereon that creates unique aesthetic appearances.

Figure 1A:
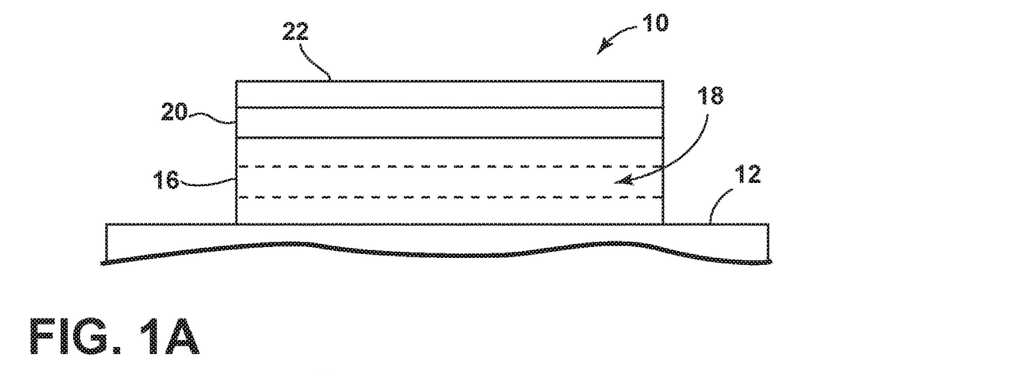
FIG. 1A is a side view of a luminescent structure rendered as a coating, according to some examples.
Figure 1B:
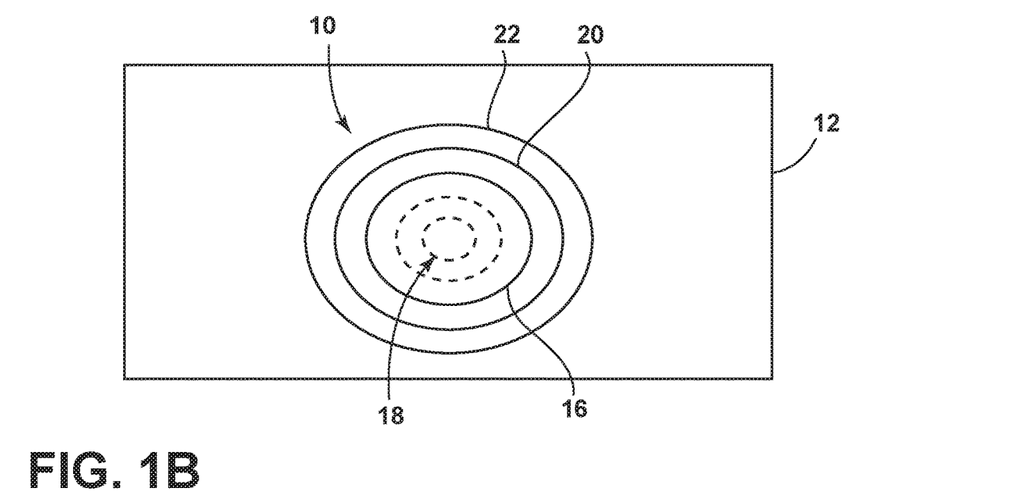
FIG. 1B is a top view of a luminescent structure rendered as a discrete particle, according to some examples.
Figure 1C:
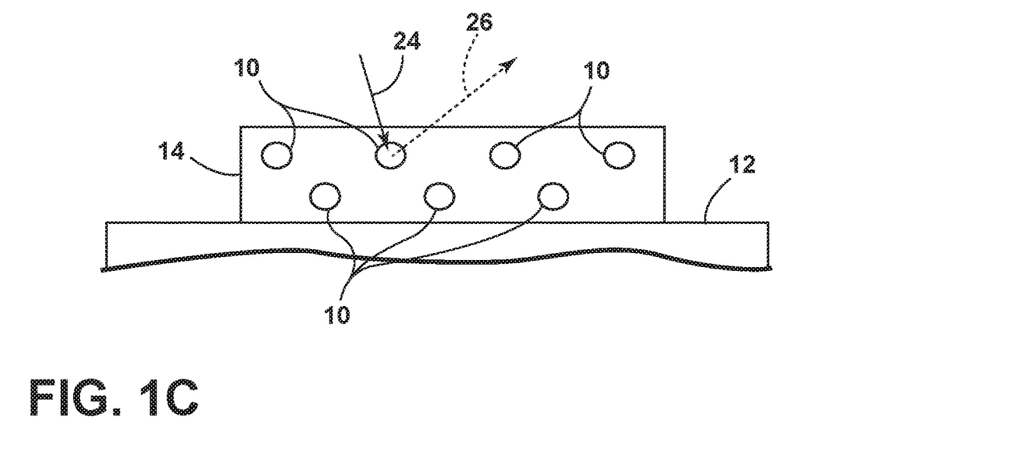
FIG. 1C is a side view of a plurality of luminescent structures rendered as discrete particles and incorporated into a separate structure.

Referring to FIGS. 1A-1C, various exemplary examples of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an incident light 24 of a specific wavelength, thereby causing the light to undergo a conversion process. Under the principle of down conversion, the incident light 24 is converted into a longer-wavelength, converted light 26 that is outputted from the luminescent structure 10. Conversely, under the principle of up conversion, the incident light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various examples, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the incident light 24 and the converted light 26 is known as the Stokes shift and serves as the principal driving mechanism for an energy conversion process corresponding to a change in wavelength of light. In the various examples discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the incident light 24 and the moment when the light intensity of the converted light 26 emitted from the luminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to various examples, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various examples, the rare earth aluminum garnet type Ce phosphor may serve as the luminescent material 18 with ultra-short-persistence characteristics, which can emit the converted light 26 by absorbing purple to blue incident light 24 emitted from one or more light sources (e.g., 30, 32 (FIG. 2)). According to various examples, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material 18 known in the art may be utilized without departing from the teachings provided herein.

Additionally, or alternatively, the luminescent material 18, according to various examples, disposed within the luminescent structure 10 may include a long-persistence luminescent material 18 that emits the converted light 26, once charged by the incident light 24. The incident light 24 may be emitted from any excitation source (e.g., any natural light source, such as the sun 28 (FIG. 2), and/or any artificial light source (e.g., a street lamp 30 (FIG. 2), a vehicle light 32 (FIG. 2)). The long-persistence luminescent material 18 may be defined as having a long decay time due to its ability to store the incident light 24 and release the converted light 26 gradually, for a period of several minutes or hours, once the incident light 24 is no longer present.

The long-persistence luminescent material 18, according to various examples, may be operable to emit light at or above an intensity of 0.32 mcd/m$^2$ after a period of 10 minutes. Additionally, the long-persistence luminescent material 18 may be operable to emit light above or at an intensity of 0.32 mcd/m$^2$ after a period of 30 minutes and, in various examples, for a period substantially longer than 60 minutes (e.g., the period may extend 24 hours or longer, and in some instances, the period may extend 48 hours). Accordingly, the long-persistence luminescent material 18 may continually illuminate in response to excitation from any one or more light sources (e.g., 30, 32) that emit the incident light 24, including, but not limited to, natural light sources (e.g., the sun 28) and/or any one or more artificial light sources (e.g., 30, 32). The periodic absorption of the incident light 24 from any excitation source may provide for a substantially sustained charge of the long-persistence luminescent material 18 to provide for consistent passive illumination. In various examples, a light sensor may monitor the illumination intensity of the luminescent structure 10 and actuate an excitation source when the illumination intensity falls below 0.32 mcd/m$^2$, or any other predefined intensity level.

The long-persistence luminescent material 18 may correspond to alkaline earth aluminates and silicates, for example, doped di-silicates, or any other compound that is capable of emitting light for a period of time once the incident light 24 is no longer present. The long-persistence luminescent material 18 may be doped with one or more ions, which may correspond to rare earth elements, for example, Eu2+, Tb3+, and/or Dy3. According to one non-limiting exemplary example, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various examples, may be a translucent white color, and in some instances reflective, when unilluminated. Once the luminescent structure 10 receives the incident light 24 of a particular wavelength, the luminescent structure 10 may emit any color light (e.g., blue or red) therefrom at any desired brightness. According to various examples, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the incident light 24 and d-d transitions of Mn2+ ions.

According to an alternate non-limiting example, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Referring to FIG. 2, a vehicle 34 includes a body 36 formed from a plurality of panels 38.

A decal assembly 40 is attached to one or more of the panels 38. As shown in FIG. 2, the decal assembly 40 is arranged as an elongated decal assembly 40 extending longitudinally along a portion of the vehicle 34. However, the decal assembly 40 may take any shape without departing from the scope of the present disclosure. For example, the decal assembly 40 may be configured as a badge or emblem that is disposed on the vehicle 34. The decal assembly 40 may be arranged as a door 44 or body 36 accent and may be located on any portion of the vehicle 34 without departing from the scope of the present disclosure. For example, the decal assembly 40 may be positioned along a bottom portion of a front fender 42, the door 44, and/or a rear fender 46 of the vehicle 34. Additionally, the decal assembly 40 may be configured as a strip that extends along a hood 48 and/or a trunk 50 of the vehicle 34. It will be appreciated that the decal assembly 40 provided herein may also be disposed within a passenger compartment of the vehicle 34 without departing from the scope of the present disclosure. According to some examples, the decal assembly 40 may be configured to luminesce in response to excitation by light emitted from a light source 28, 30, 32. The luminescence exhibited by the decal assembly 40 may provide one or more distinct lighting functions and/or a unique aesthetic appearance.

Figure 3:
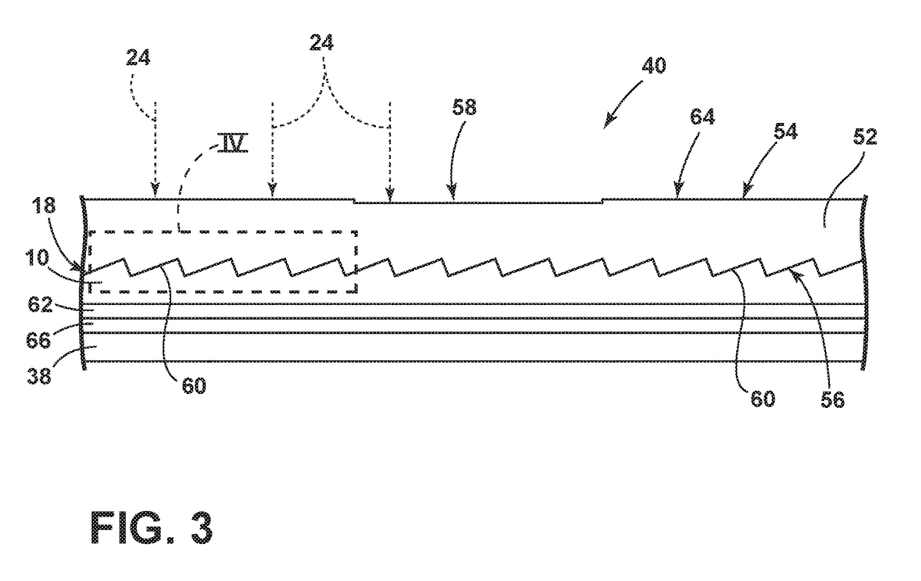
FIG. 3 is a cross-sectional view of the decal assembly taken along the line of FIG. 2, according to some examples.

Referring to FIG. 3, a cross-sectional view taken along the line of FIG. 2 illustrating a vehicle panel 38 employing the decal assembly 40 is shown, according to some examples. The panel 38 may be any practicable material known in the art. In some examples, the panel 38 may be made through any suitable manufacturing process, such as stamping.

According to some examples, the decal assembly 40 may be formed of a substrate 52 defining one or more surfaces 54 (e.g., an A-surface 54 and/or a B-surface 56 of the substrate 52). The substrate 52 may be formed of a polymeric, metallic, elastomeric, and/or ceramic material. In polymeric examples, the substrate 52 may include acyclic, acrylonitrile butadiene styrene, nylon, polylactic acid, polycarbonate, polyether sulfone, polyethylene, polypropylene, polyvinyl chloride, a liquid crystal polymer, cyclo-olefin copolymer, other thermoplastic materials, thermoset materials, and/or combinations thereof.

According to various examples, the substrate 52 may be embossed, textured, engraved, or otherwise modified to define a pattern 58. It will be understood that the pattern 58 may be raised or lowered relative to other surfaces of the substrate 52. In other examples, the pattern 58 may be in the same plane as the surrounding surfaces. In raised and/or lowered examples of the pattern 58, such raising and lowering may provide textural and/or visual depth to the decal assembly 40 and/or the pattern 58. The pattern 58 may be a symbol, alphanumeric text, a picture, a number, a logo, a simulated texture (e.g., abrasive, and/or other texture) or a combination thereof. The substrate 52 may define one or more discrete patterns 58 (e.g., multiple separate patterns 58 spaced across the surface 54). According to various examples, the pattern 58 may be indicia. Moreover, the luminescent structure 10 may define the pattern 58. According to other examples, the surface 54 may define a plurality of patterns 58 which tessellate across the surface 54. According to yet to other examples, the surface 54 may define a plurality of patterns 58, which repeat across the surface 54 (i.e., in contact with, connected to and/or in a discontinuous manner).

According to various examples, one or more diffraction grating 60 may be defined within the substrate 52. The diffraction grating 60 may be integrally defined by the B-surface 56 of the substrate 52 or may be part of a coating applied to the substrate 52. The diffraction grating 60 may be distinguished from traditional texturing or ridging of decal assemblies in that traditional texturing or ridging is configured to decrease shine, glare, reflectance, and/or optical effects from the decal assembly 40, while the diffraction grating 60 is configured to diffract and scatter light impinging on the decal assembly 40. The decal assembly 40 may include a single, continuous, diffraction grating 60 extending therealong. In continuous examples of the diffraction grating 60, the diffraction grating 60 may extend over a length of the decal assembly 40 to enhance visual detail. Alternatively, a plurality of diffraction grating 60 may be positioned around the decal assembly 40. In examples where a plurality of diffraction grating 60 are used around the decal assembly 40, the different portions of the diffraction grating 60 may have different properties (e.g., spacing, period or blaze angle) which may cause each diffraction grating 60 to diffract light differently (i.e., be noticeably different from one another). Such an example may be advantageous in highlighting different portions of the pattern 58 from one another. In yet other examples, only a portion of the decal assembly 40 may include the diffraction grating 60 (i.e., to highlight a specific portion of the pattern 58).

According to various examples, a diffraction grating 60 may be positioned around a roller. The roller may be configured as a conventional hot stamping die or roller that includes a negative of the diffraction grating 60 thereon. As the substrate 52 interacts with the hot stamping die or roller, the diffraction grating 60 is imprinted onto the substrate 52.

With further reference to FIG. 3, the luminescent structure 10 may be disposed on the B-surface 56, or otherwise arranged below the substrate 52. In various examples, a long-persistence luminescent material 18 may be disposed within the luminescent structure 10 such that the decal assembly 40 continues to emit light for periods of time once incident light 24 is no longer present. As discussed above, the long-persistence luminescent material 18, according to some examples, may be operable to emit light at or above an intensity of 0.32 mcd/m² after a period of 10 minutes. Additionally, the long-persistence luminescent material 18 may be operable to emit light above or at an intensity of 0.32 mcd/m² after a period of 30 minutes and, in some examples, for a period substantially longer than 60 minutes (e.g., the period may extend 24 hours or longer, and in some instances, the period may extend 48 hours). Accordingly, the long-persistence luminescent material 18 may continually illuminate in response to excitation from any light source(s) that emits the incident light 24, including, but not limited to, natural light sources (e.g., the sun 28) and/or any artificial light source 30, 32. The periodic absorption of the incident light 24 from any excitation source may provide for a substantially sustained charge of the long-persistence luminescent material 18 to provide for consistent passive illumination.

A reflective layer 62 may be disposed above the on an opposing side of the luminescent structure 10 from the substrate 52. The reflective layer 62 may include any reflective material that generally functions to redirect incident light 24 that is directed from the environment proximate the decal assembly 40 towards the substrate 52. It will be appreciated that the reflective layer 62 may be reflective and/or retroreflective. Accordingly, in examples where the reflective layer 62 has reflective properties, the incident light 24 may be spread, refracted, and/or scattered as the incident light 24 passes therethrough. In examples where the reflective layer 62 has retroreflective properties, the incident light 24 may be redirected in a substantially opposing direction to the direction at which the incident light 24 approached the reflective layer 62.

According to some examples, the reflective layer 62 is a coating, such as a boron nitride, aluminum oxide, zirconium oxide coating, and/or any other practicable material that reflects the incident and/or converted light. It is noted that the reflective layer 62 could be disposed on other portions of the decal assembly 40 to direct or reflect incident light 24 and/or converted light in a desired direction and/or to minimize radiation from being emitted in an undesired direction. The reflective layer 62 may reflect more than 90% of the incident light 24, which may include light of the UV and deep UV wavelength range. In examples of the reflective layer 62 that include boron nitride, the boron nitride particles may be of a relatively small size. A small particle size is advantageous, since it may lead to an overall decreased weight content of boron nitride in the composition, which not only results in a more cost-effective and more environmentally friendly composition, but also a composition that may be easier to produce.

With further reference to FIG. 3, the reflective layer 62 may further include reflective particles including metal oxide. Examples of metal oxide particles that may be used in the composition, in addition to the particles including boron nitride, include, but are not limited to, aluminum oxide and yttrium oxide. The particles including boron nitride and any further particles including metal oxide may be present in the reflective composition at any desired weight ratios relative to each other. The reflective layer 62 may be used to direct the incident light 24 and/or converted light in a desired output direction. The reflective layer 62 may further be used to direct the converted light through a viewable portion 64 of the substrate 52 to increase the efficiency and the performance of the decal assembly 40.

Referring still to FIG. 3, in operation, according to some examples, the incident light 24 directed towards the decal assembly 40 enters the substrate 52. A first portion of the incident light 24 is redirected by the diffraction grating 60. A second portion of the incident light 24 may pass through the diffraction grating 60 and enter the luminescent structure 10. In some examples, a first fraction of the second portion becomes converted light 26 and a second fraction is reflected off the reflective layer 62. The luminescent material 18 is formulated to become excited upon receiving incident light 24 of a specific wavelength from any excitation source, such as the sun 28 or any artificial light source 30, 32. As a result, the incident light 24 undergoes an energy conversion process and is re-emitted at a different wavelength as converted light 26. According to some examples, the luminescent material 18 may be formulated to convert incident light 24 into a longer wavelength light, otherwise known as down conversion. Alternatively, the luminescent material 18 may be formulated to convert incident light 24 into a shorter wavelength light, otherwise known as up conversion. Under either approach, light converted by the luminescent material 18 may be outputted from the luminescent structure 10 or otherwise used in an energy cascade, wherein the converted light 26 serves as incident light 24 to excite another formulation of luminescent material 18 located within the energy conversion layer 16, whereby the subsequent converted light 26 may then be outputted from the luminescent structure 10 or used as incident light 24, and so on. With respect to the energy conversion processes described herein, the difference in wavelength between the incident light 24 and the converted light 26 is known as the Stokes shift and serves as the principal driving mechanism for an energy conversion process corresponding to a change in wavelength of light.

In some examples, the energy conversion process is undertaken by way of down conversion, whereby the incident light 24 includes a light on the lower end of the visible spectrum such as blue, violet, or ultraviolet (UV) light. Doing so enables natural incident light 24, such as sun light, to be used as the excitation source. Accordingly, the decal assembly 40 may produce a daytime luminescence, reflectivity, and/or coloration. In addition, the luminescent structure 10 may emit converted light 26 at night when light (i.e., streetlights 30, vehicle lights 32, etc.) shine on the luminescent structure 10.

According to various examples, the luminescent structure 10 discussed herein is substantially Lambertian, that is, the apparent brightness of the luminescent structure 10 is substantially constant regardless of an observer's angle of view. As described herein, the color of the converted light 26 may be significantly dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent material(s) 18 in the luminescent structure 10 discussed herein may be operable to generate a range of color hues of the incident light 24 by blending the first wavelength with the second wavelength.

In some examples, an adhesive layer 66 may form a base of the decal assembly 40 to removably or permanently attach the decal assembly 40 to a desired location on the panel 38. In some examples, a pressure-sensitive adhesive may be utilized. The pressure-sensitive adhesive allows installation of the decal assembly 40 by removing a release liner, positioning the decal assembly 40 in the correct location on a panel 38, and pressing the decal assembly 40 in place to activate the adhesive and set the bond between the decal assembly 40 and the panel 38.

Alternatively, or additionally, a retention feature may be utilized for securing the decal assembly 40 to the panel 38 of the vehicle 34. According to some examples, the retention feature includes an elongate clip extending from the decal assembly 40 and configured to be inserted through an aperture defined by the panel 38. The retention feature may further include a selectively releasable locking device configured to transition between a locked state and an unlocked state and is configured to obstruct the withdrawal of the elongate clip from the panel 38 when in the locked state.

Figure 4A:
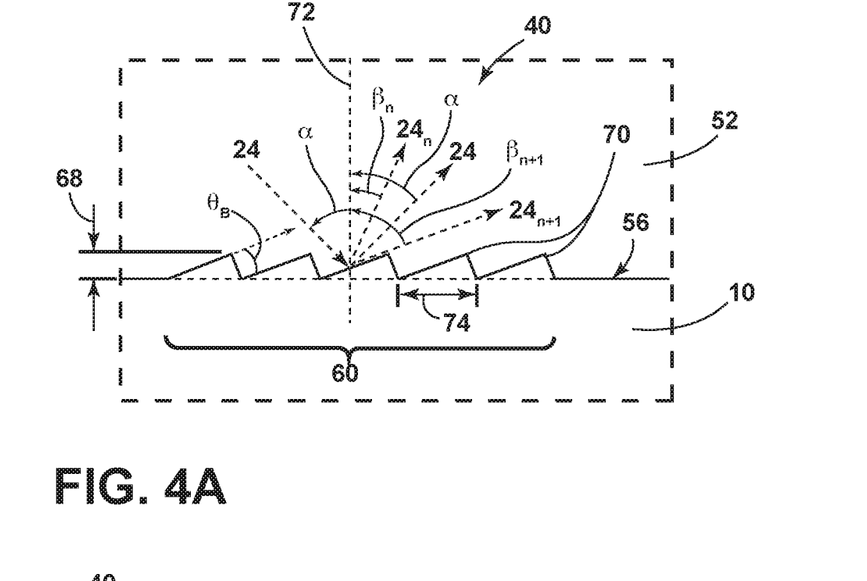
FIG. 4A is an enhanced view of area IV of FIG. 3 illustrating a diffraction grating disposed within a substrate of the decal assembly, according to some examples.
Figure 4B:
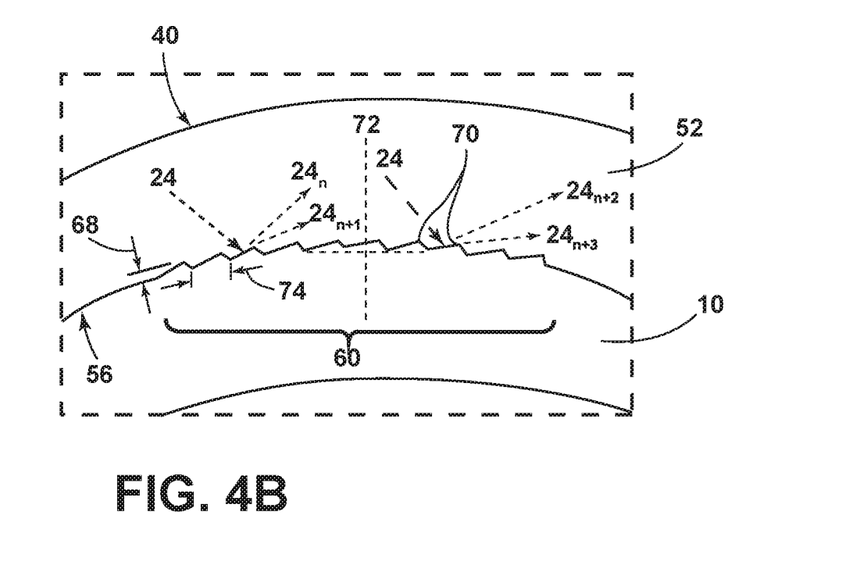
FIG. 4B is an enhanced view of area IV of FIG. 3 illustrating a diffraction grating disposed within a substrate of the decal assembly, according to some examples.

Referring now to FIGS. 4A and 4B, the diffraction grating 60 is configured to produce an iridescent pattern to incident light 24 impinging upon it. The diffraction grating 60 may be present on a flat example of the substrate 52 on a curved example of the substrate 52, or on other shapes of the substrate 52. For example, the diffraction grating 60 may be configured to reflect light of different wavelengths in different directions. The diffraction grating 60 may have a thickness 68 that ranges from about 250 nm to about 1000 nm. The thickness 68 of the diffraction grating 60, for example, may be maintained in the range of about 250 nm to about 1000 nm to ensure that the diffraction grating 60 portion of the pattern 58 exhibits a jewel-like appearance in light. The thickness 68 of the diffraction grating 60 ranges from about 390 nm to 700 nm. In other examples, the thickness 68 of the diffraction grating 60 ranges from 500 nm to 750 nm. As depicted in FIG. 4A in exemplary form, the diffraction grating 60 may define a plurality of ridges 70 having a saw tooth or triangular shape. In three dimensions, the ridges 70 of the grating 60 can appear with a stepped or saw tooth shape without angular features, pyramidal in shape, or some combination of stepped and pyramidal shapes. Other shapes of the ridges 70 of the diffraction grating 60 include hill-shaped features (e.g., sinusoidal- or curved-shaped features). The diffraction grating 60 can also include portions with a combination of triangular- and hill-shaped ridges 70. More generally, the shapes of the grating 60 should be such that an effective blazing angle $\theta_B$ of at least 15 degrees is present for one or more portions of each ridge 70, grating, tooth, or groove of the diffraction grating 60. The blaze angle $\theta_B$ is the angle between step normal (i.e., the direction normal to each step or tooth of the grating 60) and a direction normal 72 to the surface having the grating 60.

Generally, the blaze angle $\theta_B$ is optimized to maximize the efficiency of the wavelength(s) of the incident light 24 which may be typical ambient light from the sun 28, light from the luminescent structure 10 or light from a light source (e.g., 30, 32), to ensure that maximum optical power is concentrated in one or more diffraction orders while minimizing residual power in other orders (e.g., the zeroth order indicative of the ambient light itself). An advantage of situating the diffraction grating 60 on planar portions or aspects of the surface 54 is that a constant blaze angle $\theta_B$ and a period 74 will result in consistent reflected and diffracted light produced from the diffraction grating 60.

The diffraction grating 60 of the decal assembly 40 may be characterized by one or more periods 74 (also known as d in the standard nomenclature of the diffraction grating 60). In most aspects of the decal assembly 40, the period 74 of the diffraction grating 60 is maintained between about 50 nm and about 5 microns. In general, the maximum wavelength that a given diffraction grating 60 can diffract is equal to about twice the period 74. Hence, a diffraction grating 60 with a period 74 that is maintained between about 50 nm and about 5 microns can diffract light in an optical range of 100 nm to about 10 microns. According to one example, the period 74 of a diffraction grating 60 is maintained from about 150 nm to about 400 nm, ensuring that the diffraction grating 60 can efficiently diffract light in an optical range of about 300 nm to about 800 nm, roughly covering the visible spectrum.

Incident light 24 and/or converted light at an incident angle α is directed against a sawtooth-shaped diffraction grating 60 having a thickness 68, a period 74 and a blaze angle $\theta_B$. More particularly, a portion of the incident light 24 (preferably, a small portion) striking the diffraction grating 60 at an incident angle α is reflected as reflected light $24_n$ at the same angle α, and the remaining portion of the incident light 24 is diffracted at particular wavelengths corresponding to diffracted light $24_n$, $24_{n+1}$, etc., at corresponding diffraction angles $\beta_n$, $\beta_{n+1}$, etc. The reflected light $24_n$ is indicative of the zeroth order (i.e., n=0) and the diffracted light $24_n$, $24_{n+1}$, $24_{n+2}$ are indicative of the nth order diffraction according to standard diffraction grating terminology, where n is an integer corresponding to particular wavelengths of the reflected or diffracted light.

Figure 4C:
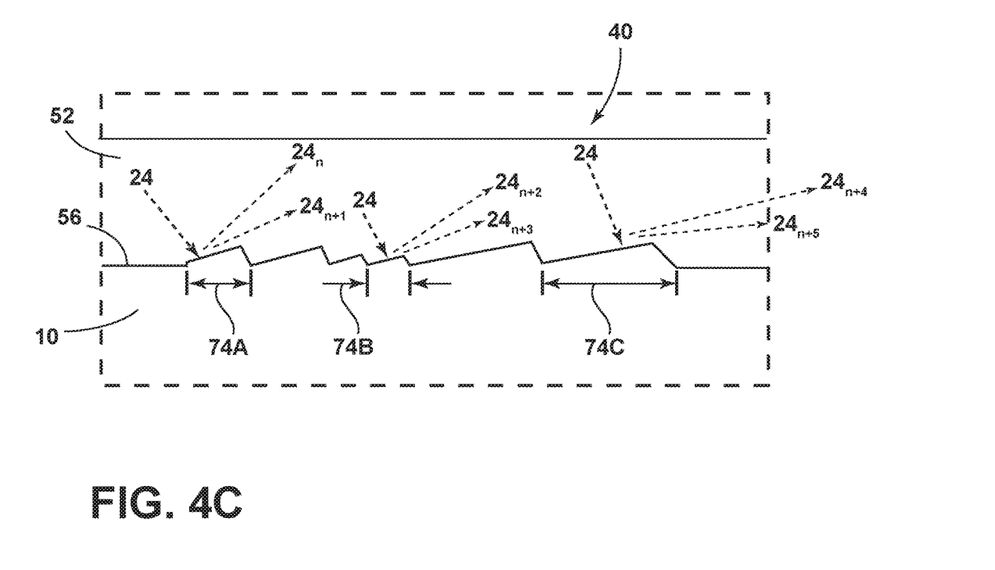
FIG. 4C is an enhanced view of area IV of FIG. 3 illustrating a diffraction grating disposed within a substrate of the decal assembly, according to some examples.

Referring now to FIG. 4C, an example of the diffraction grating 60 employing varying periods (e.g., as including a set of periods) that can be employed in the decal assembly 40 is depicted. In the depicted example, the diffraction grating 60 can have two or more sets of teeth or grooves, each having a particular period 74 that can produce light at unique, or differing diffraction orders. As shown, the grating 60 is configured with three periods—period 74A, period 74B, and period 74C. One set of teeth of the diffraction grating 60 with a period of 74A can produce diffracted light $24_n$ and $24_{n+1}$, a different set of teeth with a period of 74B can produce diffracted light $24_{n+2}$ and $24_{n+3}$, and a third set of teeth with a period of 74C can produce diffracted light $24_{n+4}$ and $24_{n+5}$, all from the same incident light 24. Consequently, the diffraction grating 60 advantageously can produce jewel-like effects of widely varying wavelengths within various regions of the pattern 58.

In some aspects, the diffraction grating 60 includes a varying period that varies between two to ten discrete values or, more preferably, between two to five discrete values across the diffraction grating 60. According to another aspect, the diffraction grating(s) 60 with varying periods can be employed in one or more portions of the decal assembly 40, and one or more diffraction grating(s) 60 having a constant period are employed in other portions of the decal assembly 40 to create interesting, jewel-like appearance effects produced by the decal assembly 40 employing the grating(s) 60. In another example, the diffraction grating(s) 60 includes a varying period that changes between any number of values, only limited by the overall length of the grating(s) 60 and/or the processing capabilities to develop such variability through precise control of mold dimensions. In another example, there may be a plurality of diffraction grating(s) 60 in a spaced-apart configuration across the decal assembly 40. In such an example, the plurality of diffraction grating(s) 60 may have the same or a different period. In various examples, the diffraction grating(s) 60 may substantially cover the B-surface 56 of the substrate 52.

In some examples, optional coatings may be applied to the substrate 52. For example, an optically clear sealing layer (e.g., a polyurethane seal) can be applied over exterior surfaces to add further mechanical and/or ultraviolet light protection to the decal assembly 40, particularly to any diffraction grating(s) 60. Advantageously, the addition of a relatively thin protective coating can protect the diffraction grating 60 while retaining the benefits of locating the grating 60 on the decal assembly 40 in terms of diffraction efficiency and the overall iridescence obtained by the decal assembly 40. Further, the sealing layer may be textured (i.e., on interior applications) to provide a desired "feel" (e.g., leather, wood, soft, etc.) to the substrate 52 and/or the decal assembly 40.

According to another aspect of the disclosure, a method of making an iridescent member (e.g., the decal assembly 40) is provided that includes a step of forming a mold with mold surfaces corresponding to the components of the iridescent member (e.g., substrate 52, pattern 58, etc.).

Next, the method of forming the iridescent member includes a step of ablating at least one of the mold surfaces to form one or more diffraction grating mold surfaces. For example, the ablating step is conducted to form one or more diffraction patterns (e.g., diffraction grating 60) on the mold surfaces intended to be incorporated in portions of the iridescent member (e.g., decal assembly 40). According to various examples, the ablating step is conducted with a laser ablation process. Laser ablation processes (e.g., employing an AgieCharmilles Laser cutting apparatus from Georg Fischer Ltd.) are particularly adept at developing the diffraction pattern mold surfaces in the mold given their ability to precisely ablate microscopic features into metal and metal alloy mold surfaces. The diffraction grating 60 may be formed in one or more patterns on the mold surface. It will be understood that the pattern 58 may be formed at the same or substantially the same time as the diffraction grating 60.

Referring again to the method of making the iridescent member, the method may also include a step of forming a component (e.g., the substrate 52) of the iridescent member (e.g., decal assembly 40). The component may be formed according to known injection molding techniques employed by those skilled in the field with the mold described above. As such, the component may include the diffraction grating 60 and the pattern 58 integrally defined therein.

Use of the present disclosure may offer a variety of advantages. For instance, use of the decal assembly may provide various light functions for the vehicle, such as functioning as a side marker for the vehicle. The decal assembly may also employ a diffraction grating, a portion thereof to provide a unique aesthetic appearance to the decal assembly. The decal assembly may also include a reflective material and/or a luminescent material thereon to passively illuminate the decal assembly. The decal assembly may include any or all of the features provided herein and still is manufactured at low costs when compared to standard decals and lighting assemblies.

According to various examples, a vehicle decal assembly is provided herein. The vehicle decal assembly includes a substrate having a diffraction grating along a surface thereof. A luminescent structure is disposed along a surface of the substrate. A reflective layer is disposed on an opposing side of the luminescent structure from the substrate. An adhesive layer is configured to maintain the substrate on a vehicle panel. Examples of the vehicle decal assembly can include any one or a combination of the following features:
  the diffraction grating comprises a plurality of ridges having a thickness of between about 250 nm to about 1000 nm;
  the luminescent structure comprises at least one luminescent material configured to convert an incident light in a non-visible spectrum received into a visible, converted light;
  the reflective layer includes boron nitride;
  the luminescent structure includes a long-persistence luminescent material therein;
  the incident light comprises one of blue light, violet light, and UV light;
  said decal assembly extends longitudinally along a portion of a vehicle;
  the substrate has a pattern integrally formed therein;
  a first portion of an incident light is redirected by the diffraction grating and a second portion of the incident light excites the luminescent structure;
  a first fraction of the second portion becomes converted light and a second fraction is reflected off the reflective layer; and/or
  the diffraction grating comprises a plurality of ridges having a period of the diffraction grating between about 50 nm and about 5 microns.

Moreover, a method of manufacturing a vehicle decal assembly is provided herein. The method includes forming a substrate having a diffraction grating along a surface thereof. A luminescent structure is disposed along a surface of the substrate. A reflective layer is positioned on an opposing side of the luminescent structure from the substrate. An adhesive layer is disposed on the reflective layer, the adhesive layer configured to maintain the substrate on a vehicle panel.

According to some examples, a decal assembly for a vehicle is provided herein. The decal assembly includes a substrate having a diffraction grating along a surface thereof. The diffraction grating has a thickness of between about 250 nm to about 1000 nm. A reflective layer is disposed rearwardly of the substrate. An adhesive layer is configured to maintain the substrate on a vehicle panel. Examples of the decal assembly for a vehicle can include any one or a combination of the following features:

- a luminescent structure disposed along a surface of the substrate;
- the thickness of the diffraction grating is between about 500 nm and about 750 nm; and/or
- a period of the diffraction grating is between about 50 nm and about 5 microns.

According to other examples, a decal assembly is provided herein. The decal assembly includes a substrate and a luminescent structure disposed along a surface of the substrate. A reflective layer is disposed on an opposing side of the luminescent structure from the substrate. An adhesive layer couples the substrate to a vehicle panel. Examples of the decal assembly can include any one or a combination of the following features:

- the substrate has a diffraction grating along a surface thereof;
- the luminescent structure defines a pattern that is visible through the substrate;
- the thickness of the diffraction grating is between about 500 nm and about 750 nm; and/or
- a period of the diffraction grating is between about 50 nm and about 5 microns.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle decal assembly, comprising:
 a substrate having a diffraction grating along a surface thereof;
 a luminescent structure disposed along the surface of the substrate;
 a reflective layer including boron nitride and disposed on an opposing side of the luminescent structure from the substrate; and
 an adhesive layer configured to maintain the substrate on a vehicle panel.

2. The vehicle decal assembly of claim 1, wherein the diffraction grating comprises a plurality of ridges having a thickness of between about 250 nm to about 1000 nm.

3. The vehicle decal assembly of claim 2, wherein the luminescent structure comprises at least one luminescent material configured to convert an incident light in a non-visible spectrum received into a visible, converted light.

4. The vehicle decal assembly of claim 3, wherein the incident light comprises one of blue light, violet light, and UV light.

5. The vehicle decal assembly of claim 3, wherein a first portion of an incident light is redirected by the diffraction grating and a second portion of the incident light excites the luminescent structure.

6. The vehicle decal assembly of claim 5, wherein a first fraction of the second portion becomes converted light and a second fraction is reflected off the reflective layer.

7. The vehicle decal assembly of claim 1, wherein the diffraction grating comprises a plurality of ridges having a period of the diffraction grating between about 50 nm and about 5 microns.

8. The vehicle decal assembly of claim 1, wherein the luminescent structure includes a long-persistence luminescent material therein.

9. The vehicle decal assembly of claim 1, wherein said decal assembly extends longitudinally along a portion of a vehicle.

10. The vehicle decal assembly of claim 1, wherein the substrate has a pattern integrally formed therein.

11. A decal assembly for a vehicle, comprising:
a substrate having a diffraction grating along a first surface thereof, wherein the diffraction grating has a thickness of between about 250 nm to about 1000 nm, the substrate having an opposing, second surface defining a plurality of patterns tessellating across the second surface;
a reflective layer disposed rearwardly of the substrate; and
an adhesive layer configured to maintain the substrate on a vehicle panel.

12. The decal assembly for a vehicle of claim 11, further comprising:
a luminescent structure disposed along a surface of the substrate.

13. The decal assembly for a vehicle of claim 11, wherein the thickness of the diffraction grating is between about 500 nm and about 750 nm.

14. The decal assembly for a vehicle of claim 11, wherein a period of the diffraction grating is between about 50 nm and about 5 microns.

15. A decal assembly, comprising:
a luminescent structure disposed along a first surface of a substrate, the substrate having an offset pattern in an opposing second surface, the pattern having lowered portions disposed closer to the luminescent structure than the remaining portions of the second surface;
a reflective layer disposed on an opposing side of the luminescent structure from the substrate; and
an adhesive layer coupling the substrate to a vehicle panel.

16. The decal assembly of claim 15, wherein the substrate has a diffraction grating along a surface thereof.

17. The decal assembly of claim 16, wherein the thickness of the diffraction grating is between about 500 nm and about 750 nm.

18. The decal assembly of claim 16, wherein a period of the diffraction grating is between about 50 nm and about 5 microns.

19. The decal assembly of claim 15, wherein the luminescent structure defines a pattern that is visible through the substrate.

* * * * *